US007899064B2

(12) United States Patent
Kim et al.

(10) Patent No.: US 7,899,064 B2
(45) Date of Patent: Mar. 1, 2011

(54) SYSTEM PAGING METHOD AND APPARATUS OF HETEROGENEOUS WIRELESS NETWORKS

(75) Inventors: Seung-Hee Kim, Daejeon (KR); Dae-Sik Kim, Daejeon (KR); Jin-Sung Cho, Suwon (KR); Geon-Baik Lee, Seoul (KR)

(73) Assignees: Electronics and Telecommunications Research Institute, Daejon (KR); Industry Academic Cooperation Foundation Kyunghee University, Gyeonggi-do (KR)

( * ) Notice: Subject to any disclaimer, the term of this patent is extended or adjusted under 35 U.S.C. 154(b) by 522 days.

(21) Appl. No.: 11/607,418

(22) Filed: Dec. 1, 2006

(65) Prior Publication Data

US 2007/0127498 A1 Jun. 7, 2007

(30) Foreign Application Priority Data

Dec. 2, 2005 (KR) ...................... 10-2005-0116952

(51) Int. Cl.
*H04L 12/56* (2006.01)
(52) U.S. Cl. .................. 370/395.52; 370/311; 370/401; 370/352; 370/338

(58) Field of Classification Search ............ 370/395.52, 370/311, 401, 352, 338
See application file for complete search history.

(56) References Cited

U.S. PATENT DOCUMENTS

| | | | | |
|---|---|---|---|---|
| 6,466,571 | B1 * | 10/2002 | Dynarski et al. | 370/352 |
| 2003/0148777 | A1 * | 8/2003 | Watanabe et al. | 455/458 |
| 2006/0126582 | A1 * | 6/2006 | Saifullah et al. | 370/338 |
| 2006/0126645 | A1 * | 6/2006 | Devarapalli et al. | 370/401 |

OTHER PUBLICATIONS

Kempf, J., "Dormant Mode Host Alerting ("IP Paging") Problem Statement." Jun. 2001. *The Internet Society*.
Kempf, J., et al., "Requirements and Functional Architecture for an IP Host Alerting Protocol." Aug. 2001. *The Internet Society*.

* cited by examiner

*Primary Examiner*—David Q Nguyen
(74) *Attorney, Agent, or Firm*—Ladas & Parry LLP

(57) ABSTRACT

A paging method and apparatus for minimizing power consumption under a heterogeneous wireless network environment is provided. The terminal can recognize data reception from the heterogeneous network using a CDMA2000 network having a wide service range under a heterogeneous wireless network environment terminal, and can open only necessary network interfaces at a predetermined time.

8 Claims, 3 Drawing Sheets

FIG. 4

| Service Option Group (Decimal) | Type of Services in the Group |
|---|---|
| 15 | Network Selection Services |
| Service Option Number (Decimal) | Designated Use/Type of Service Option |
| 32760 | Packet Data Service Selection : WLAN |
| 32761 | Packet Data Service Selection : WiBro |
| 32762 | Packet Data Service Selection : CDMA2000 |

SYSTEM PAGING METHOD AND APPARATUS OF HETEROGENEOUS WIRELESS NETWORKS

BACKGROUND OF THE INVENTION (a) Field of the Invention

The present invention relates to a system paging method and apparatus for minimizing power consumption under a heterogeneous wireless network environment. More particularly, the present invention relates to a system paging method and apparatus for minimizing terminal-power consumption in a heterogeneous wireless network including a Code Division Multiple Access (CDMA) 2000 wireless Internet access service, 2.3 GHz portable Internet (Wibro) service, and 802.11 wireless local area network (WLAN) services.

(b) Description of the Related Art

Generally, in order to page a terminal, the CDMA 2000 mobile communication system recognizes a terminal location through a Home Location Register (HLR) and Visited Location Register (VLR), and informs a packet call reception to the corresponding terminal. Meanwhile, one of working groups (WG) of the Internet Engineering Task Force (IETF), that is, Seamoby (Seamoby being a WG for gathering various technological requirements and developing the corresponding protocols so as to exchange state information between wireless equipment on hand-off and provide seamless hand-off) has provided various alternatives for providing seamless mobility.

Request for Comments (RFC) 3132 and RFC 3154 describe IP paging considerations in a terminal-power saving mode and express requirements and logical structures according to the IP paging considerations. However, the RFC 3132 proposes only a concept regarding IP paging in a heterogeneous network, and RFC 3154 proposes only RFC 3132-based logical structure.

In reality, under a heterogeneous wireless network environment, the terminal opens interfaces with the entire wireless networks so as to catch data transmitted thereto. That is, the terminal always supplies power for all network interfaces, and the terminal is overburdened since it has only a predetermined amount of resources.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system paging method and apparatus having advantages of minimizing terminal power consumption by opening an interface to only a predetermined network service (predetermined network) under a heterogeneous wireless network environment. In addition, the present invention has been made in an effort to provide a system paging method and apparatus having advantages of opening an interface to one network and transmitting data from other networks through the open network to a terminal.

An exemplary embodiment of the present invention provides a system paging method for informing of data transmission from a first terminal on a first network to a second terminal on a second network under a plurality of heterogeneous wireless network environments connected to at least two networks. The system paging method includes (a) the system receiving a packet from the first terminal;

(b) mapping an IP address of a destination of the packet with an IP address of a binding list, wherein the binding list stores location information including IP address of the registered terminals;

(c) selecting a predetermined network when there is no IP address in the binding list as a result of the mapping of the IP address; and (d) the system transmitting a page message including the selected network information to the second terminal and requesting paging to the selected network. Another embodiment of the present invention provides a system paging apparatus for informing of a data transmission from a first terminal on a first network to a second terminal on a second network under a plurality of heterogeneous wireless network environments connected to at least two networks. The system paging apparatus includes:

a home agent for receiving a packet from the first terminal and mapping an IP address of a destination of the packet with an IP address of a binding list wherein the binding list stores location information including IP addresses of the registered terminals, and requesting paging to the IP address of the destination of the packet;

a heterogeneous network controller for mapping the IP address in an IMSI (International Mobile Station Identity) home address table according to the paging request and outputting a paging request message; and a home location register for providing an IMSI generated by the home location register to the heterogeneous network controller in response to the paging request message.

BRIEF DESCRIPTION OF THE DRAWINGS

FIG. 4 illustrates a service option redefinition added to a page message according to an exemplary embodiment of the present invention.

DETAILED DESCRIPTION OF THE EMBODIMENTS

Figure 1:
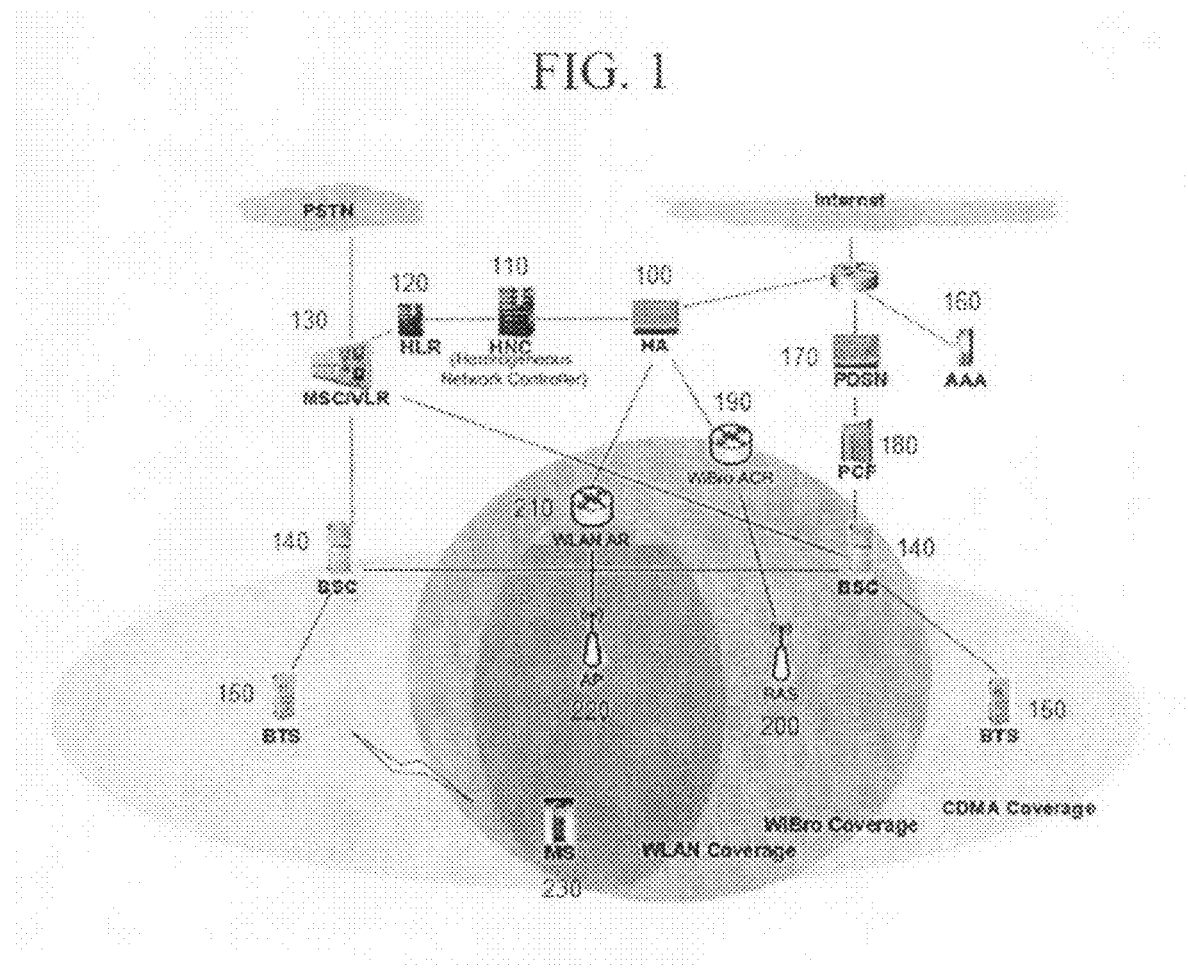
FIG. 1 illustrates a heterogeneous wireless network system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is coupled to another element, the element may be directly coupled to the other element or coupled to the other element through a third element.

In order to describe an exemplary embodiment of the present invention in detail, terms are defined as follows. A term "data" is in reference to the network providing a service, and generally includes a packet of an Internet protocol network and an ATM call of an Asynchronous Transfer Mode network (ATM).

In addition, the term "paging reason" refers to why the CDMA2000 mobile communication system performs paging to the terminal in a network when the CDMA2000 mobile communication system does so. The paging reason is transmitted through a service option of a page message to the terminal.

FIG. 1 illustrates a heterogeneous wireless network system according to an exemplary embodiment of the present invention.

In order to support all of the voice service and packet service to a mobile subscriber, a heterogeneous wireless network system includes a home agent (HA) 100, a heterogeneous network controller (HNC) 110, an HLR 120, a mobile switching center/visitor location register (MSC/VLR) 130, a packet data serving node (PDSN) 170, a packet control function (PCF) packet controller 180, an authentication authorization and accounting (AAA) unit 160, and a mobile station (MS) terminal 230. They all are connected through the Internet.

In addition, the heterogeneous wireless network system includes a base station controller (BSC) 140 and a base transceiver station (BTS; base station) 150 so as to provide a service for the widest CDMA coverage. It also includes a WLAN access router (AR) 210 and access point (AP) 220 so as to provide a service in the WLAN coverage. The heterogeneous wireless network system includes a WiBro access control router (ACR; control station) 190 and radio access station (RAS; base station) 200 so as to provide a service for the wireless portable Internet coverage.

In order to classify coverage where each network can provide a service in the heterogeneous networks, the BSC 140, BTS 150, the WLAN AR 210, the AP 220, the WiBro ACR 190, the RAS 200, etc., are separately referred to. However, the BTS 150, the AP 220, and the RAS 200 have identical functions, and the BSC 140, the WLAN AR 210, and the WiBro ACR 190 have identical functions.

In a mobile node, the HA 100 consists in a home network, and is a router for maintaining the MS 230 location information and transmitting data to the MS 230. The MS 230 is connected to the external network in a mobile fashion. That is, when the HA 100 is accessed to the HNC 110 of the CDMA 2000 network and receives the packet according to a mobile IP process, it searches a binding list mapped with a destination address of the corresponding packet and transmits a paging request message when the destination address of the corresponding packet is not in the binding list.

According to an exemplary embodiment of the present invention, the HNC 110 connects the HA 100 and HLR 120 through a newly included network unit, and provides MS 230 information to interpret the MS 230 location and perform paging to the MS 230. That is, the HNC 110 performs the mapping function between the IP address received from the HA 100 and the information of a Home Address table such that the MS 230 may perform paging.

Figure 2:
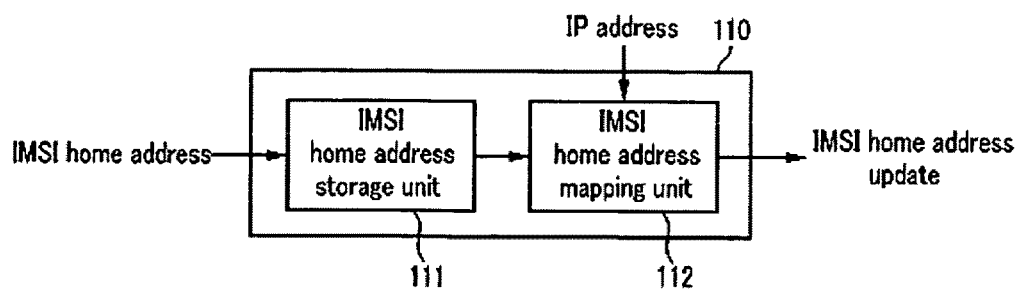
FIG. 2 illustrates a heterogeneous network controller according to an exemplary embodiment of the present invention.

At this time, the HNC 110 includes an IMSI home address storage unit 111 and an IMSI home address mapping unit 112 in a heterogeneous network controller according to an exemplary embodiment of the present invention as shown in FIG. 2.

As shown in FIG. 2, the IMSI home address storage unit 111 receives the HLR 120-generated IMSI and home address information when the user-terminal is registered on the heterogeneous wireless network and the CDMA2000 network (referred to as a second network). The IMSI home address mapping unit 112 transmits the MS 230 information to the HLR 120 by mapping the IP address from the HA 100 with the information of the IMSI home address storage unit 111.

As shown in FIG. 1, the HLR 120 stores a service profile regarding a user that accesses the service network and provides an automatic roaming service to the user having mobility by performing a location management, state management, and authentication function to the MS 230 and subscriber based on the service profile. That is, the HLR 120 is a database for managing mobile communication subscriber-location information, and it is interworked with the MSC/VLR 130.

In the MSC/VLR 130, the MSC performs an exchange function to the service signal from the mobile communication subscriber so as to provide a mobile communication service. The MSC is divided into many processors for performing unique functions. Accordingly, all entire functions are dividedly processed. In addition, the VLR performs a visitor location registration function using the service of the MSC and manages such visitor information.

The base station system (BSS) includes the BSC 140 and BTS 150. The BSC 140 accesses various wire networks and controls the BTS 150, and the BTS 150 performs wireless transmission to the mobile station. That is, the BTS 150 (mobile station) connects the MS 230 to the BSC 140 and performs a wire/wireless conversion function through wireless communication with the MS 230 and wired communication with the BSC 140. The BSC 140 adjusts an inter-BTS 150 connection by accessing the BTS 150 to the exchange station, and performs a signal process function so as to allow communication between the BTS 150 and the exchange station.

The AAA 160 performs user authentication, authority verification, and accounting functions. The AAA 160 may also use a Remote Authentication Dial-In User Service (RADIUS) protocol and perform a service accounting information gathering function, a mobile IP registration authentication function, and a dial-in service user authentication/authority verification function.

The PDSN 170 is interworked with the BSC 140 and provides a mobile management function to the user of the MS 230 when the MS 230 is periodically moved, and accordingly, the MS 230 may use an Internet data service without changing the IP address of the MS.

The PCF 180 and BSC 140 are interworked with the PDSN 170, and perform handover control management, MS 230 packet data service profile management, data relay between the PCF 180 and the radio resource controller, packet buffering, and inter-PCF 180 packet session information transmission on hand-off.

The RAS 200 and WiBro ACR 190 transmit/receive data to/from the MS 230 through the wireless interface in the wired network node. The ACR 190 connects the HA 100 to the RAS 200 (base station) in the wireless portable Internet network, controls the MS 230 and the RAS 200, and performs IP packet routing.

The WLAN AR 210 connects the AP 220 (base station) to the HA 100 in the wireless LAN network, and the AP 220 functions as a relay in the wireless LAN network. That is, the AP 220 accepts signals of the wireless LAN cards and the MS 230 receives data through the AP 220.

Figure 3:
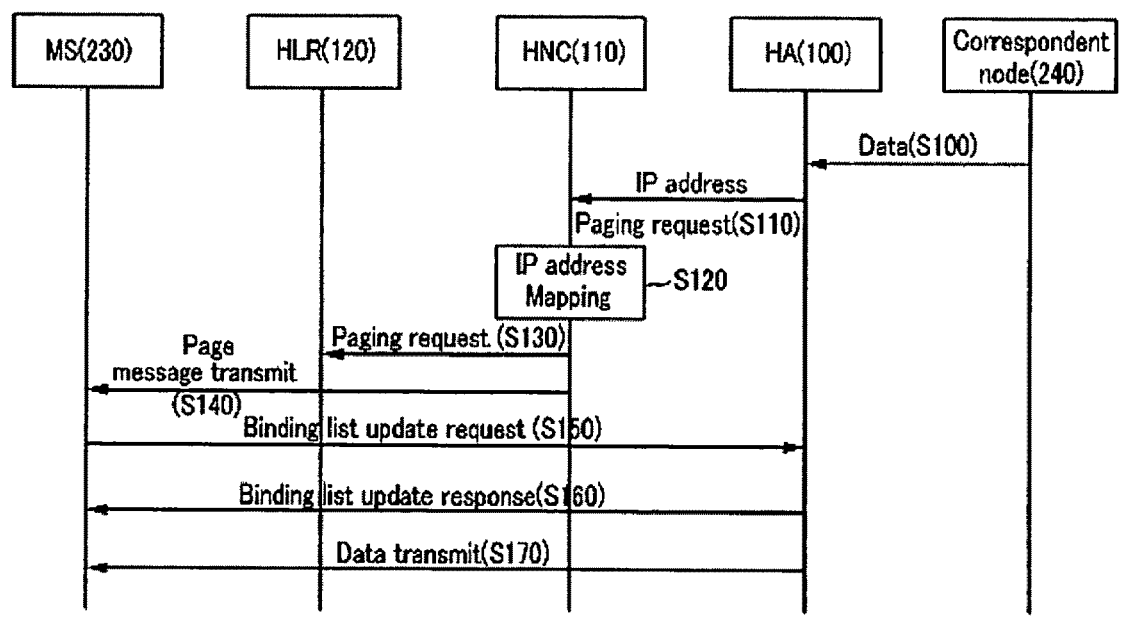
FIG. 3 is a packet data transmission flowchart according to an exemplary embodiment of the present invention.

Transmitting packet data in the heterogeneous network environment including such constituent elements is described in detail with reference to FIG. 3. FIG. 3 is a packet data transmission flowchart according to an exemplary embodiment of the present invention.

FIG. 3 illustrates that the MS 230 opens the corresponding network interface through the CDMA2000 network when there are data to be transmitted from the heterogeneous network.

When the correspondent node 240 (hereinafter referred to as "CN") is to transmit data to the MS 230 under a heterogeneous network (or referred to as a first network), the CN 240 may transmit the data to the MS 230 through any network (S100). The data transmitted from the CN 240 is forwarded in the HA 100 using the mobile IP process. Since the mobile IP process is well known to a person of an ordinary skill in the art, the detailed description thereof may be omitted.

The HA 100 receives a data packet and performs mapping of the IP address of the forwarded data packet with the maintained binding list. The binding list forms an exchange path of data packets between each MS 230 and the end host. The MS 230 uses the binding list information, accesses a common communication network such as the Internet, and exchanges data with the end host. At this time, the PDSN 170 system corresponding to an external agent is provided between the Internet and the home network and may control subscriber information exchange, IP address management, and tunnel formation functions.

When there is an IP address corresponding to the binding list as a result of mapping the data packet with the IP address, the HNC 110 receives an IP address paging request including an IP address of the packet (S110). Since the MS 230 always maintains a CDMA2000-based circuit voice service, the HNC 110 performs mapping of the maintained table of the IMSI (International mobile Station Identity) storage unit 111 with the IP address from the HA 100 by means of the IMSI home address mapping unit 112 (S120).

Generally, the IMSI described in EIA/TIA IS-95A indicates a unique identifier stored in a Subscriber Identity Module (SIM) of the MS 230. The MS 230 transmits the IMSI to the BTS 150 so as to distinguish the MS in the GSM network, and the BTS 150 searches the IMSI in the HLR. The IMSI includes a Mobile Country Code (MCC), a Mobile Network Code (MNC), and a Mobile Station Identification Number (MSIN). The mobile station identification number is used for Registration/Origination/Paging of the MS 230.

The table of the IMSI home address storage unit 111 of the HNC 110 is updated with the IMSI and home address of the user's MS 230 as the IMSI is previously registered on the HLR 120 when the user subscribes to the MS 230 to use the network at the time at which the initial user uses a service according to an exemplary embodiment of the present invention. The HNC 110 requests paging to the HLR 120 (S130), and then transmits page messages through the CDMA2000 circuit voice service to the MS 230 (S140). The paging message is identical to the general CDMA2000 page message. However, it sets service options for determining a paging reason such that it distinguishes the network selection.

The MS 230, having received the page message from the HNC 110, requests an update of the binding list of the HA 100 (S150). The HA 100 receives the update request and updates the binding list including location information of the CN 240 under the heterogeneous network according to the result of mapping of the IP address of the HNC 110, and responds to the binding list update to the MS 230 (S160).

The MS 230 receives the binding list update response and sets a service option of the page message as a predetermined network, and opens an interface to the corresponding selected network. The binding list update request step S150 may be a registration process (e.g., a Mobile IPv6 binding process or Mobile IPv4 registration process) with the HA 100. Accordingly, the registration process of with the HA 100 is completed and then the data forwarded in the HA 100 are transmitted through the corresponding network (S170).

FIG. 4 is a table for expressing a service option redefinition added to a page message according to an exemplary embodiment of the present invention.

The table for redefining a service option shown in FIG. 4 includes types of service options added so as to indicate paging reasons in the page message shown in FIG. 3. Referring to FIG. 4, the page message is the same as that used in the CDMA2000 mobile communication system, and the MS 230 receives the page message including added service options and then opens a network interface of a predetermined network.

The service option is divided as a Proprietary Service Option used by providers and a Standard Service Option defined in a standard. The service option according to an exemplary embodiment of the present invention refers to the standard service option. According to an exemplary embodiment of the present invention, the standard service option is divided into a plurality of service option groups, and a service option group is referred to as a Network Selection Service.

The network selection service group includes three service options for each IEEE 802.11 WLAN, 2.3 GHz portable Internet WiBro, and CDMA2000 packet data service. The MS 230 evaluates the corresponding network through the network service options added to the page message and opens the network interface.

A program for realizing functions corresponding to elements according to an exemplary embodiment of the present invention or the recording medium thereof are included in the spirit of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, the terminal can recognize data reception from the heterogeneous network using a CDMA2000 network having a wide service range under a heterogeneous wireless network environment terminal, and can open only necessary network interfaces at predetermined times. Accordingly, unnecessary power consumption due to opening of all the network interfaces may be removed.

What is claimed is:

1. A paging method in a system for informing a second terminal on a second network of data transmission from a first terminal on a first network under a plurality of heterogeneous wireless network environments connected to at least two networks, the system paging method comprising:

(a) the system receiving a packet from the first terminal on the first network;

(b) mapping a destination IP address of the packet from the first terminal with an IP address in a binding list, wherein the binding list stores location information including IP addresses of terminals registered on the plurality of heterogeneous wireless network environments;

(c) selecting a predetermined network to which the second terminal is connected when there is no IP address in the binding list as a result of the mapping of the IP address; and (d) the system transmitting a page message to the second terminal including information of the first network, on the predetermined network to which the second terminal is connected and requesting paging to the first network, wherein the second terminal opens a network interface based on a service option corresponding to the first network included in the page message transmitted on the predetermined network and receiving the packet from the first terminal using the opened network interface corresponding to the first network, and wherein the page message includes service options including paging reason for indicating reasons that the system performs paging to the second terminal.

2. The system paging method of claim 1, wherein the first network is connected to the system.

3. The system paging method of claim 1 or claim 2, wherein the step (b) further includes mapping the destination IP address of the packet from the first terminal to an IMSI of the second terminal registered on an IMSI (International Mobile Station Identity) home address table.

4. The system paging method of claim 1, wherein the step (d) includes:
   (i) updating the binding list by registering the IP address of the second terminal in the binding list according to a binding list update request from the second terminal; and
   (ii) informing the second terminal of the updated result of the binding list.

5. The system paging method of claim 1, wherein the network interface corresponds to one of a WLAN, WiBro, and CDMA2000 packet data service.

6. A paging apparatus in a system for informing a second terminal on a second network of a data transmission from a first terminal on a first network under a plurality of heterogeneous wireless network environments connected to at least two networks, the system paging apparatus comprising:
   a home agent for receiving a packet from the first terminal, mapping a destination IP address of the packet from the first terminal with an IP address in a binding list wherein the binding list stores location information including IP addresses of terminals registered on the plurality of heterogeneous wireless network environments, and requesting paging to the destination IP address of the packet;
   a heterogeneous network controller for mapping the destination IP address in an IMSI (International Mobile Station Identity) home address table according to the paging request, and outputting a paging request message; and
   a home location register for providing an IMSI generated by the home location register to the heterogeneous network controller in response to the paging request message,
   wherein the heterogeneous network controller transmits a page message to the second terminal, the page message having a service option including service information for selecting a network interface of the second terminal to open that corresponds to the first network of the first terminal, such that the second terminal receives the packet from the first terminal using the opened interface, and
   wherein the page message includes service options including paging reason for indicating reasons that the system performs paging to the second terminal.

7. The system paging apparatus of claim 6, wherein the heterogeneous network controller includes:
   an IMSI home address storage unit for receiving the IMSI and the home address information generated by the home location register; and
   an IMSI home address mapping unit for mapping the destination IP address of the packet received from the first terminal and the information of the IMSI home address unit.

8. The system paging apparatus of claim 6, wherein the network interface corresponds to one of a WLAN, WiBro, and CDMA2000 packet data service.

* * * * *